July 13, 1926.
J. A. MORGAN
PUMP
Filed August 4, 1925   2 Sheets-Sheet 1
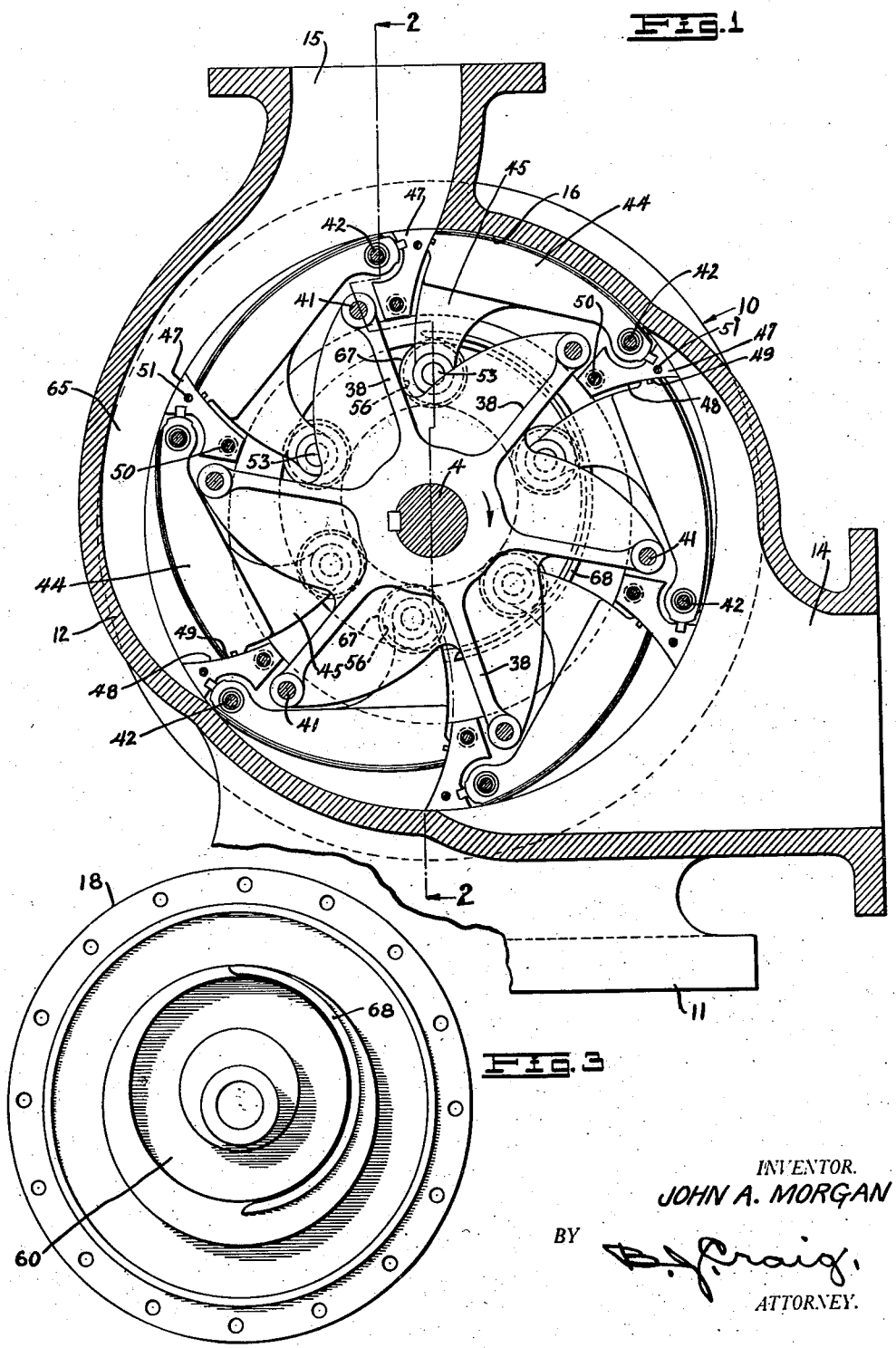
INVENTOR.
JOHN A. MORGAN
BY
ATTORNEY.

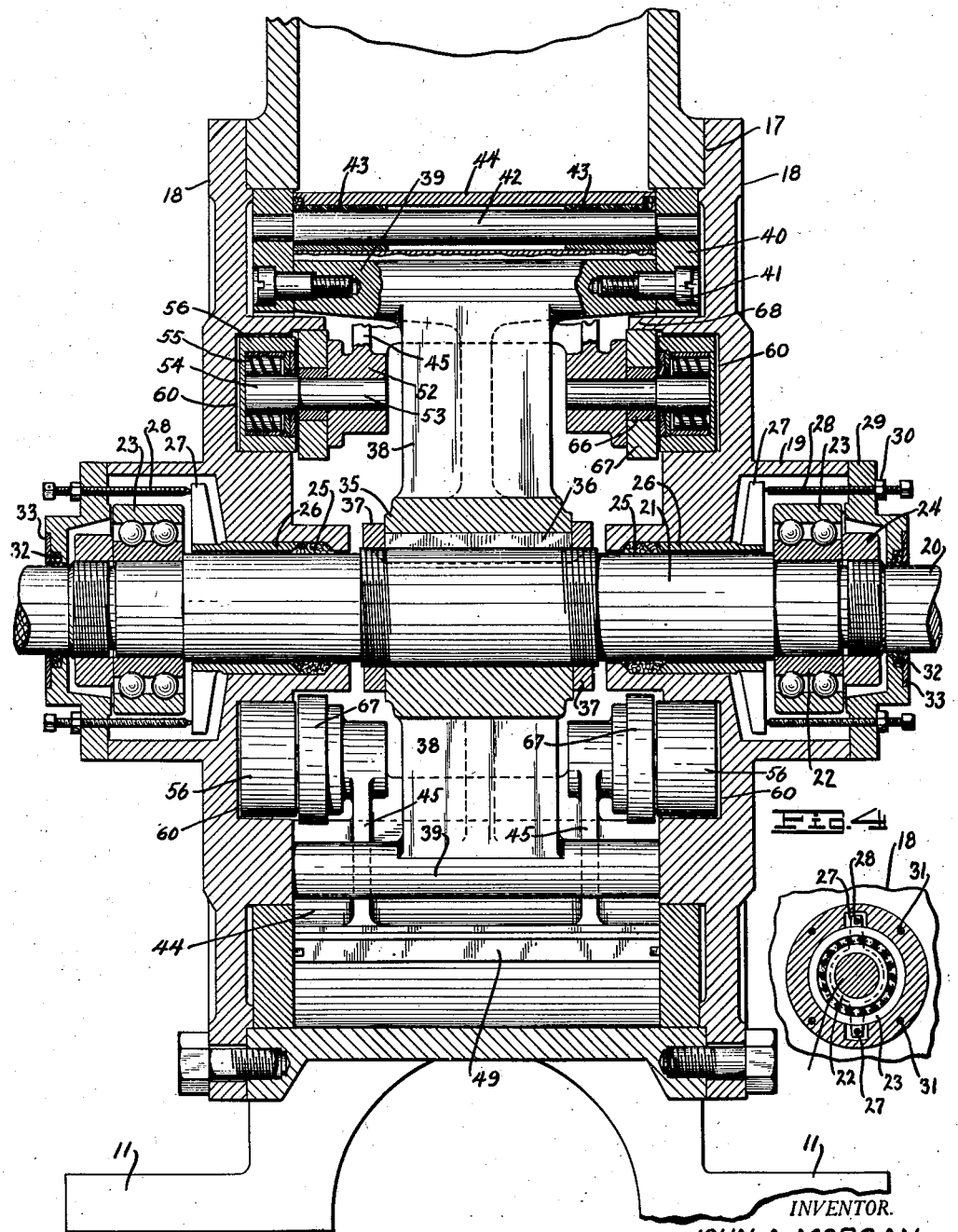

Patented July 13, 1926.

1,592,216

UNITED STATES PATENT OFFICE.

JOHN A. MORGAN, OF LOS ANGELES, CALIFORNIA.

PUMP.

Application filed August 4, 1925. Serial No. 48,043.

This invention relates to pumps.

The general object of the invention is to provide an improved rotary pump construction.

One of the specific objects of the invention is to provide a pump of the rotary displacement type, wherein radially movable impellers are used, and wherein novel means is provided for giving movement to the impellers.

Another object of the invention is to provide a rotary pump wherein radially mounted impellers are employed and wherein means is provided for positively moving the impellers inwardly and outwardly.

Other objects of the invention will be apparent from the following description, taken in connection with the accompanying drawings wherein:

Fig. 1 is a central sectional view through a pump embodying the features of my invention.

Fig. 2 is a transverse section on line 2—2 of Fig. 1.

Fig. 3 is a side elevation of one of the closure plates, and

Fig. 4 is a section on line 4—4 of Fig. 3.

Referring to the drawings by reference characters, I have shown a pump embodying the features of my invention at 10. This pump comprises a base portion 11 and a body portion 12. The body portion is provided with an inlet 14 and an outlet 15, and the interior portion of the body has a substantially cylindrical face 16.

The ends of the body are preferably plane as shown at 17, and upon these plane ends I mount closure plates 18. These closure plates are similar in construction although reversely arranged, and a description of one will suffice as a description for both.

Each closure plate is provided with a hollow boss 19. Within this hollow boss I mount a drive shaft 20. This drive shaft is provided with a shoulder 21 upon which the inner member 22 of a ball race 23 is mounted. The outer member of the ball race engages the inner face of the boss 19 as shown in Fig. 4, so that the shaft is mounted for free rotary movement.

A nut 24 is threaded near each end of the shaft 20 and serves to hold the ball races in place. Suitable packing 25 is mounted around the shaft 20 and is held in place by a sliding collar 26 which has ears 27 thereon. These ears 27 are adapted to be engaged by a set screw 28 which is held in a cap member 29. Lock nuts 30 serve to hold the set screw 28 in an adjusted position, so that the packing 25 will be compressed. The cap member 29 will be held in place by suitable bolts 31. This cap member is shown as recessed to receive the nut 24, and is provided with packing 32 which is held in place by an annular disk 33.

Mounted upon the shaft 20 I show a spider 35. This spider is keyed to the shaft by means of the key 36, and is prevented from moving laterally thereon by means of threaded collars 37.

The spider is indicated as provided with a plurality of arms 38, which are enlarged at their outer ends as shown at 39. At either side of these enlarged portions 39 I mount a pair of annular rings 40. These rings are held to the spider arms by means of bolts 41 so that when the spider 35 rotates it will carry the annular rings with it.

Supporting rods 42 are arranged between the two rings 40 and are spaced at even distances about these rings. The rods 42 are provided with bushings 43 on which impellers 44 are pivotally mounted. These impellers have their outer faces parallel and in sliding engagement with the inner wall of the body 12. The impellers are each provided with a pair of spaced arms 45, the purpose of which will be presently described.

Adjacent the pivot point of each impeller I fix an abutment 47. Each abutment has a curved face 48 which is adapted to engage the end face 49 of an impeller. The center of the curvature of the parts 48 and 49 is the axis about which the impellers turn. The abutments are secured in place to rotate with the rings 40 by means of screws 50 and dowel pins 51.

The arms 45 are provided with bosses 52, and upon these bosses I arrange stub shafts 53 which have headed extremities 54. Upon each headed extremity I mount a ball race 55 on which a roller 56 is supported.

The closure plates 18 are provided with slots 60 in the inner faces thereof. These slots are arranged eccentric to the axis of the shaft 21 and are adapted to receive the rollers 56 which are constrained to move in the recesses 60 so that as the shaft rotates and carries the spider with it the rollers will move about in the grooves and will also move toward and from the axis of the shaft 21, consequently moving the impellers towards and from the wall of the casing.

When the device shown in Fig. 1 is used as a pump the shaft will rotate in a clockwise direction and the action of the impellers will first draw fluid through the inlet 14 into a chamber A which is defined by the outer face of an impeller, the inner wall of the casing and by the contiguous walls of the closure plates.

As the shaft rotates the impellers will move to a position shown in the cavity B where the impeller which is moving outwardly will be in communication with the channel 65 which communicates with the outlet 15.

The rollers 56 may serve to move the impellers inwardly and outwardly, but as this action would necessitate a reversal of the direction of rotation of the rollers, I preferably arrange the rollers to act only to force the impellers outwardly.

This requires a separate means for moving the impellers inwardly, and to accomplish this I arrange upon the shafts 53 bushings 66 which receive rollers 67. The inner wall of each closure plate is provided with a rib 68 which is preferably curved substantially as shown in Fig. 3. This rib 68 coacts with the roller 67 to move the impellers inwardly. When the rollers 67 engage the rib 68 the rollers 56 will be out of contact with the wall of their recesses and they will merely idle around for a part of a revolution.

From the foregoing description it will be apparent that I have provided a pump which is simple in construction and highly efficient in use.

It will be understood that although I have described my invention as embodied in a pump, the features thereof may be incorporated in a rotary engine, a meter, or in other rotary mechanisms.

What I claim is:

1. In a device of the class described, a casing having a cylindrical aperture therein, a pair of end closure plates for said casing, a shaft mounted to rotate on said closure plates, a spider mounted on said shaft, a pair of annular rings mounted on the outer part of said spider, a plurality of impellers pivotally mounted on the said rings, said impellers having rollers thereon, and means moving said impellers inwardly and outwardly.

2. In a pump, a casing having a cylindrical aperture therein, a pair of end closure plates fixed on said casing, a pair of annular rings mounted to rotate in close proximity to the closure plates, impellers pivotally mounted on said rings said impellers having projections thereon, said closure plates having internal grooves therein, said projections being adapted to fit said grooves to cause motion of said impellers.

3. In a pump, a casing having a cylindrical aperture therein, a pair of end closure plates fixed on said casing, a pair of annular rings secured within the casing to rotate therein, impellers pivotally mounted on said rings, said impellers having projections thereon, said closure plates having means thereon for engaging said projections to cause outward motion of said impellers, and other means for causing said impellers to move inwardly.

4. In a pump, a casing having a cylindrical casing, a shaft mounted in said casing, a pair of annular rings secured to rotate with said shaft, impellers pivotally mounted on said rings, said closure plates having internal grooves therein, and means fitting said grooves and coacting with said impellers to cause outward motion of said impellers.

5. In a pump, a casing having a cylindrical aperture therein, a pair of end closure plates fixed on said casing, a shaft mounted to rotate in said casing, a pair of annular plates mounted to rotate about the axis of said shaft, members connecting said annular plates, impellers pivotally mounted on said members said impellers engaging the inner face of said closure plates, abutments between said annular rings, said abutments having curved faces engaging one end of the impellers, stub shafts mounted on said impellers, rollers mounted on the stub shafts, said closure plates having grooves therein, said rollers being adapted to fit said grooves to cause outward motion of said impellers. an arcuate rib on the inner faces of said closure plates, and other rollers mounted on said impellers and adapted to engage said arcuate ribs to move said impellers inwardly.

6. In a pump, a casing having a cylindrical aperture therein, a pair of end closure plates fixed on said casing, bosses on said closure plates, anti-friction members mounted in said bosses, a shaft mounted on said anti-friction members, a spider, said spider including a member having a hub keyed to the shaft and having arms projecting from the hub, a pair of annular rings secured to the outer ends of said arms, one of said rings being secured at each end of the arms and in close proximity to the closure plates, cylindrical members connecting said annular plates, a bushing mounted on each cylinder member, an impeller pivotally mounted on each bushing, said impellers having stub shafts thereon, rollers mounted on said stub shafts, said closure plates having internal grooves therein, said rollers being adapted to fit said grooves to cause outward motion of said impellers, an arcuate rib on each of said closure plates, and rollers mounted on said impellers and adapted to engage said arcuate ribs to move said impellers inwardly.

7. In a pump, a casing having an inlet and an outlet, a plurality of impellers pivotally mounted in said casing, means to move said impellers on their pivots towards the casing, other means to move said impellers from the casing, and means whereby said impellers may rotate within the casing while moving on their pivots.

8. In a pump, a casing having a cylindrical aperture therein, a pair of end closure plates fixed on said casing, a shaft mounted on said casing, a spider mounted on said shaft and having arms thereon, supporting members secured to said arms and adapted to rotate therewith, means connecting said members, impellers pivotally mounted on said connecting means, said impellers engaging the inner face of said closure plates, abutments between said members, said abutments each engaging one end of an impeller, projections mounted on said impellers, said closure plates having grooves therein, said projections being adapted to fit said grooves to cause outward motion of said impellers, and other means to move said impellers inwardly.

9. In a pump, a casing having a cylindrical aperture therein, a pair of end closure plates fixed on said casing, a shaft mounted on said casing, a spider mounted on said shaft said spider including a member having a hub secured to the shaft and having arms projecting from the hub, a pair of annular rings secured to said arms and adapted to rotate therewith, one of said rings being secured at each side of the arms and in close proximity to the closure plates, impellers pivotally supported by said rings, abutments between said annular rings, said abutments each having a face engaging one of the impellers, said closure plates having grooves therein, and means on said impellers fitting said grooves to cause motion of said impellers.

10. In a pump, a casing having a cylindrical aperture threin, a pair of end closure plates fixed on said casing, bosses on said closure plates, anti-friction members mounted in said bosses, a shaft mounted on said anti-friction members, a spider mounted on said shaft, said spider including a member having a hub keyed to the shaft and having arms projecting from the hub, a pair of annular rings secured to the outer ends of said arms and adapted to rotate therewith, one of said rings being secured at each side of the arms and in close proximity to the closure plates, cylindrical members connecting said annular plates, a bushing mounted on each of said cylinder members, impellers pivotally mounted at one end on said bushing said impellers engaging the inner face of said closure plates, abutments between said annular rings, said abutments having curved faces engaging one end of the impellers, stub shafts mounted on said impellers, rollers mounted on the stub shafts, said closure plates having grooves therein, said rollers being adapted to fit said grooves to cause outward motion of said impellers, an arcuate rib on the inner face of each closure plate, and other rollers mounted on said impellers and adapted to engage said arcuate ribs to move said impellers inwardly.

In testimony whereof, I hereunto affix my signature.

JOHN A. MORGAN.